United States Patent
Yang

(10) Patent No.: US 7,764,939 B2
(45) Date of Patent: Jul. 27, 2010

(54) APPARATUS AND METHOD FOR PROCESSING INPUT SIGNALS CORRESPONDING TO THE SAME SIGNAL SOURCE AT DIFFERENT TIMINGS

(75) Inventor: Li-Ping Yang, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 580 days.

(21) Appl. No.: 11/422,602

(22) Filed: Jun. 7, 2006

(65) Prior Publication Data

US 2006/0280263 A1 Dec. 14, 2006

(30) Foreign Application Priority Data

Jun. 7, 2005 (TW) ............................... 94118792 A

(51) Int. Cl.
*H04B 1/16* (2006.01)
*H04B 7/02* (2006.01)

(52) U.S. Cl. ..................... 455/277.1; 455/293; 375/347

(58) Field of Classification Search ................ 455/63.1, 455/65, 114.2, 132, 134, 135, 137, 138, 140, 455/226.1, 269, 272, 273, 277.1, 277.2, 278.1, 455/296; 375/148, 346, 347

See application file for complete search history.

(56) References Cited

U.S. PATENT DOCUMENTS

| | | | | |
|---|---|---|---|---|
| 4,531,235 A | * | 7/1985 | Brusen | ........................ 455/273 |
| 5,561,673 A | * | 10/1996 | Takai et al. | ................... 714/708 |
| 6,574,459 B1 | * | 6/2003 | Kaminski et al. | ........... 455/272 |
| 6,940,932 B2 | * | 9/2005 | Henriksson | .................. 375/347 |
| 7,127,218 B2 | * | 10/2006 | Lindenmeier | ................ 455/101 |
| 7,155,192 B2 | * | 12/2006 | Ghassemzadeh et al. | . 455/277.1 |
| 7,356,323 B2 | * | 4/2008 | Lin et al. | .................. 455/277.2 |
| 7,426,232 B2 | * | 9/2008 | Matsuoka et al. | ........... 375/148 |
| 2002/0127983 A1 | * | 9/2002 | Black et al. | .................. 455/135 |
| 2002/0150185 A1 | | 10/2002 | Meehan et al. | |
| 2002/0164968 A1 | * | 11/2002 | Crawford | .................. 455/277.1 |
| 2003/0027540 A1 | | 2/2003 | Da Torre | |
| 2004/0170219 A1 | | 9/2004 | Sasaki et al. | |
| 2005/0032497 A1 | * | 2/2005 | Girardeau et al. | ........... 455/272 |
| 2006/0050773 A1 | * | 3/2006 | Yano | ........................... 375/148 |
| 2006/0166634 A1 | * | 7/2006 | Ido | ........................... 455/277.1 |
| 2009/0180523 A1 | * | 7/2009 | Zhou | ........................... 375/148 |

* cited by examiner

*Primary Examiner*—Blane J Jackson
(74) *Attorney, Agent, or Firm*—Thomas, Kayden, Horstemeyer & Risley, LLP

(57) ABSTRACT

A receiving apparatus includes a receiving module and a processing module. The receiving module is used for receiving a plurality of received signals and selecting the received signals to generate a plurality of input signals. The processing module is used for processing the input signals to generate an output signal.

20 Claims, 3 Drawing Sheets

APPARATUS AND METHOD FOR PROCESSING INPUT SIGNALS CORRESPONDING TO THE SAME SIGNAL SOURCE AT DIFFERENT TIMINGS

BACKGROUND OF THE INVENTION

1. Field of the Invention

The invention relates to signal processing apparatus, and more particularly, to an apparatus for processing an input signal to increase signal estimation accuracy.

2. Description of the Prior Art

In signal processing technique related fields, such as communication engineering, multimedia signal processing, medical engineering, etc., suitable processing and estimation of a received signal are required to efficiently and accurately extract signal parameters and information transmitted through an original signal corresponding to the received signal. Taking a communication system as an example, in order to acquire information transmitted from a transmitter, a receiver corresponding to the transmitter utilizes a signal processing technique to extract desired original information from a received signal having undergone interference caused by modulation, multi-path effects, channel fading, and additive noise, etc. Due to signal magnitude loss and estimation error in a signal processing procedure, however, information transmitted by the received signal is often unable to be recovered accurately.

A conventional complicated processing method is used to overcome the above-mentioned problem. When operation complexity is high, it is difficult to obtain real-time estimation of a received signal, increasing the implementation cost. Another conventional antenna diversity technique utilizes a plurality of antennas to receive a plurality of signals transmitted by the same remote signal source. After the received signals are processed and combined using appropriate combining methods (for example, equal gain combining, or maximum ratio combining), estimations are made based on a combined signal corresponding to the received signals. A lower bit error rate (BER) as well as a higher system performance of the communication system is achieved due to an at least partially independent channel fading effect of the received signals. Nevertheless, when a signal-to-noise ratio (SNR) of a specific received signal corresponding to a specific antenna is apparently higher than SNRs of the received signals corresponding to other antennas, the performance of the communication system will be approximately the same as the performance of performing signal estimations based on the specific received signal only. In this case, utilizing antenna diversity technique does not improve the performance of the communication system.

SUMMARY OF THE INVENTION

It is therefore one of the objectives of the present invention to provide an apparatus and method for processing a plurality of input signals to increase signal estimation accuracy.

The claimed invention discloses a receiving apparatus. The receiving apparatus comprises a receiving module and a processing module. The receiving module comprises at least a selector, and a plurality of input ports for receiving a plurality of received signals. The selector selects at least a received signal out of the received signals according to a control signal to generate a plurality of input signals. The processing module, coupled to the receiving module, processes the input signals to generate an output signal.

The claimed invention further provides a signal processing method. The signal processing method comprises: processing a plurality of input signals corresponding to a same signal source with different starting timings; and combining a plurality of processing results corresponding to the input signals to generate an output signal.

DETAILED DESCRIPTION

The present invention utilizes a memory property of signal processing methods. That is, a processing result is not only influenced by an instantaneous value transmitted by an input signal, but also influenced by a plurality of values transmitted by the input signal before the instantaneous value.

We assume that a communication system includes a transmitter, a first receiving module, and a second receiving module; the first and the second receiving modules have the same architecture; and each of the first and the second receiving modules generates m estimated values of an estimated signal according to k transmitted values of a transmitted signal. That is, when the first receiving module receives a plurality of transmitted values $\{s(1)\sim s(nk)\}$ transmitted by the transmitter, The first receiving module processes the values $\{s(1)\sim s(k), s(k+1)\sim s(2k), \ldots, s((n-1)k+1)\sim s(nk)\}$ and thereby generates a plurality of first estimated values $\{e1(1)\sim e1(m), e1(m+1)\sim e1(2m), \ldots, e1((n-1)m+1)\sim e1(nm)\}$ of first estimated signal. When the second receiving module receives the transmitted values $\{s(k+1)\sim s(2k), \ldots, s(n-1)k+1\sim s(nk)\}$ and thereby generates a plurality of second estimated values $\{e2(m+1)\sim e2(2m), \ldots, e2((n-1)m+1)\sim e2(nm)\}$ of a second estimated signal. We can find that the second estimated signal contains no components $\{e2(1)-e2(m)\}$ due to the shortage of corresponding components $\{s(1)-s(k)\}$ of the input signal. Furthermore, even for other components $\{s(k+1)-s(nk)\}$, estimated values corresponding to the two estimated signals $\{e1(m+1)\sim e1(nm)\}$ and $\{e2(m+1)\sim e2(nm)\}$ are different due to the fact that adopted signal processing methods of the first and the second systems posses memory property. Statistically speaking, there is a difference between the estimated signals and an accurate signal corresponding to the input signal. If the estimated signals are synchronized and combined appropriately (for example average combining) to generate a processed estimation signal, an estimation error between the accurate signal and the processed estimation signal is reduced.

Figure 1:
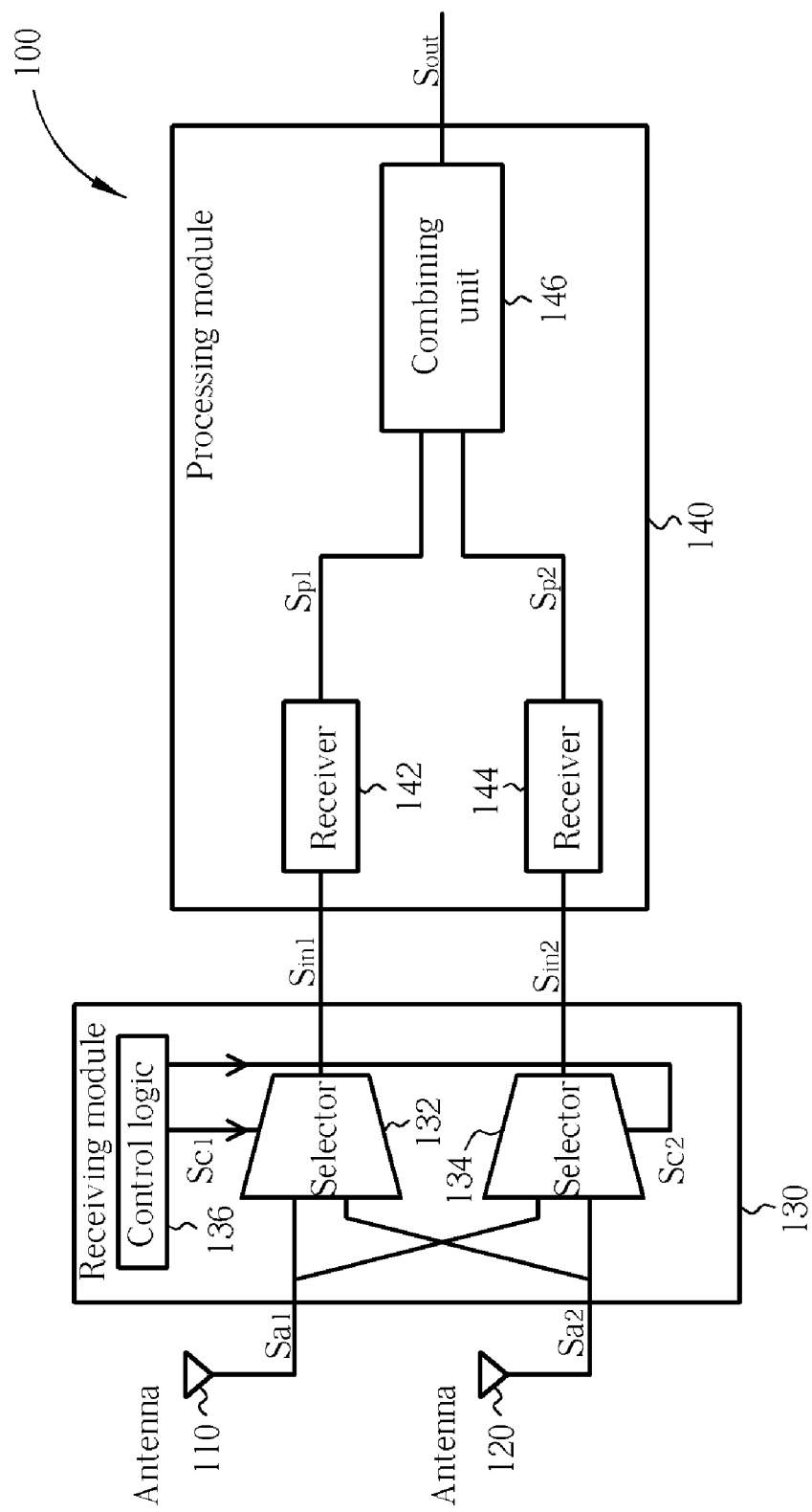
FIG. 1 is a block diagram illustrating a receiving system according to a first embodiment of the present invention.

Please refer to FIG. 1. FIG. 1 is a block diagram illustrating a receiving system 100 according to a first embodiment of the present invention. The receiving system 100 is a wireless receiving system utilizing antenna diversity technique. The receiving system 100 comprises a plurality of antennas 110, 120, a receiving module 130 and a processing module 140. The antennas 110, 120 respectively receive signals transmitted through a wireless channel from a remote signal source and generate received signals $S_{a1}$, $S_{a2}$. The receiving module 130 generates input signals $S_{in1}$, $S_{in2}$ according to the received signals $S_{a1}$, $S_{a2}$. The processing module 140 generates an output signal $S_{out}$ according to the input signals $S_{in1}$, $S_{in2}$. The output signal $S_{out}$ is a signal with a higher signalto-noise ratio (SNR) and therefore higher estimation accuracy is obtained when extracting information transmitted through the received signals $S_{a1}$, $S_{a2}$ according to the output signal $S_{out}$.

In one embodiment, the receiving module 130 comprises a plurality of selectors 132, 134, and a control logic 136. The selectors 132, 134 are both coupled to the received signals $S_{a1}$, $S_{a2}$. The selectors 132, 134 select one of the received signals $S_{a1}$, $S_{a2}$ to generate the input signals $S_{in1}$, $S_{in2}$ according to control signals $S_{c1}$, $S_{c2}$. The control signals $S_{c1}$, $S_{c2}$ are generated by the control logic 136 where the control logic 136 generates the control signals $S_{c1}$, $S_{c2}$ according to at least one of SNRs, bit error rates (BER), and error vector magnitudes (EVM) of the received signals $S_{a1}$, $S_{a2}$. In another embodiment, the control signals $S_{c1}$, $S_{c2}$ are generated by the control logic 136 according to at least one of an SNR, a bit error rate (BER), and an error vector magnitude (EVM) of the output signal $S_{out}$. In other words, parameters capable of being used to measure the system performance can be used to generate the control signals $S_{c1}$, $S_{c2}$. This is well known to those skilled in the art and is therefore omitted here for brevity.

As shown in FIG. 1, the processing module 140 comprises a plurality of receivers (i.e. processing units) 142, 144 and a combining unit 146. The receivers 142, 144 are both coupled to the input signals $S_{in1}$, $S_{in2}$ and perform operations of removing channel effects and demodulation on the input signals $S_{in1}$, $S_{in2}$. Then, the receivers 142, 144 output processed signals $S_{p1}$, $S_{p2}$ corresponding to the input signals $S_{in1}$, $S_{in2}$ to the combining unit 146. The combining unit 146 performs an averaging or a weighted averaging or other combining operation on the processed signals $S_{p1}$, $S_{p2}$ to generate the processed signals $S_{p1}$, $S_{p2}$. In an embodiment, a weighted factor is determined corresponds to a reliability of the processed signals $S_{p1}$, $S_{p2}$. Assume the input signals $S_{in1}$, $S_{in2}$ outputted by the selectors 132, 134 are the received signals $S_{a1}$, $S_{a2}$ respectively. When the control signal $S_{c1}$ triggers the selector 132 to switch an output signal $S_{in1}$ of the selector 132 from $S_{a1}$ to $S_{a2}$, the receiver 142 will be reset to an initial state. Similarly, if the control signal $S_{c2}$ triggers the selector 134 to perform a switch operation, the receiver 144 will also be reset.

Because the selectors 132, 134 will perform switch operations randomly and/or asynchronously, the receivers 142, 144 will be reset when the switch operations are performed, states corresponding to the selectors 132, 134 will be different when the selectors 132, 134 select a same received signal as their corresponding output signals (i.e. the input signal $S_{in1}$ is equal to the input signal $S_{in2}$). Since the receivers 142, 144 adopt a memory property of signal processing method, different receiving states for the receivers 142, 144 will result in different estimation results even for a same input signal. Therefore, the outputted signals of the receivers 142, 144, (the processed signals $S_{p1}$, $S_{p2}$), will be different no matter whether the input signals $S_{in1}$, $S_{in2}$ are the same or not. The combining unit 146 then combines the processed signals $S_{p1}$, $S_{p2}$ by an averaging method or a weighted averaging method to obtain the output signal $S_{out}$. As the output signal $S_{out}$ has high SNR, higher estimation accuracy can be obtained by processing the output signal $S_{out}$.

Figure 2:
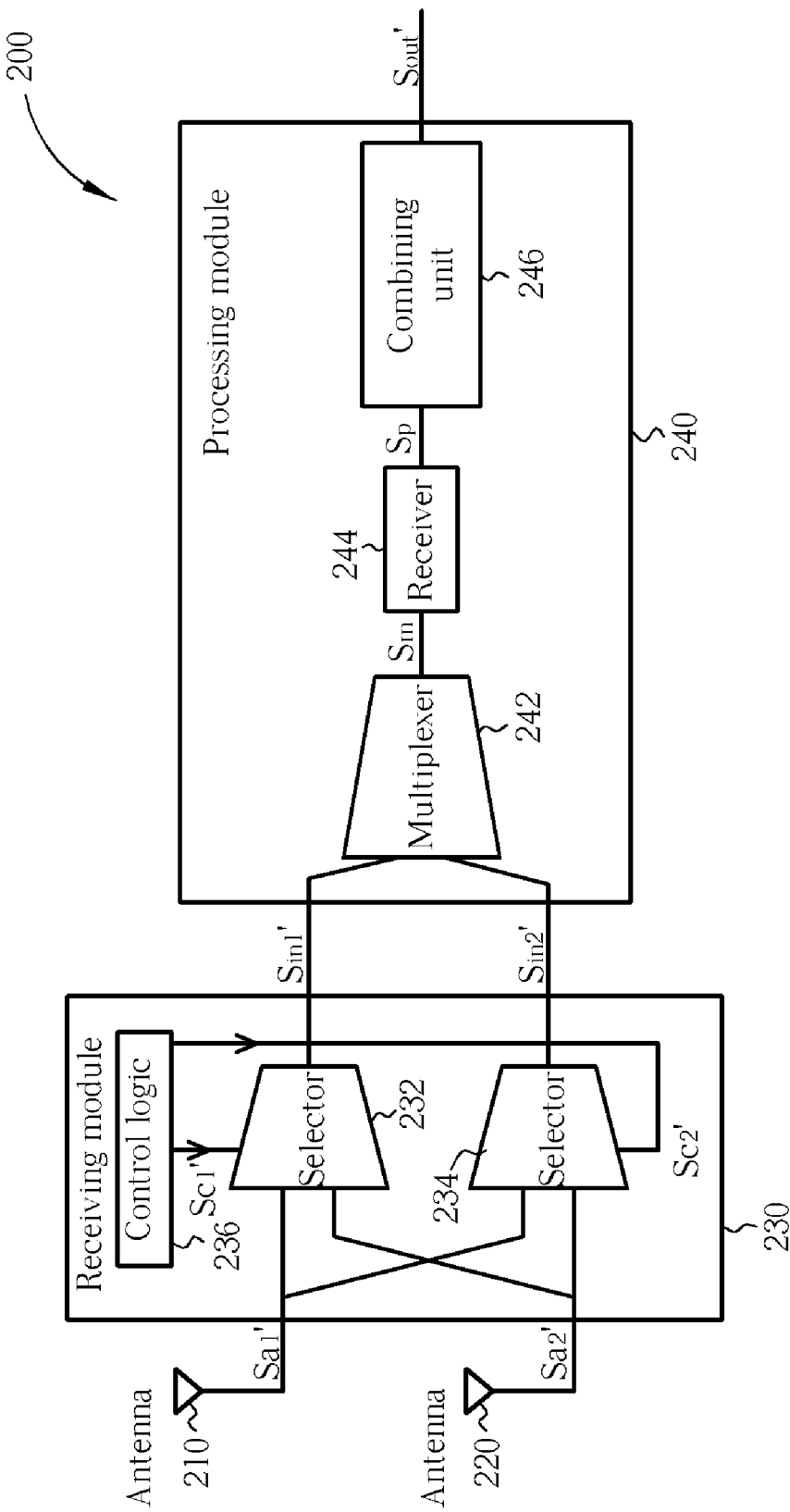
FIG. 2 is a block diagram illustrating a receiving system according to a second embodiment of the present invention.

Please refer to FIG. 2. FIG. 2 is a block diagram illustrating a receiving system 200 according to a second embodiment of the present invention. The receiving system 200 comprises a plurality of antennas 210, 220, a receiving module 230 and a processing module 240. In the present embodiment, the processing module 240 comprises a receiver 244. To be able to process a plurality of input signals $S_{in1}'$, $S_{in2}'$ from the receiving module 230, the processing module 240 further comprises a multiplexer 242 for multiplexing the input signals $S_{in1}'$, $S_{in2}'$ to generate a multiplexed input signal $S_m$, which is further fed into the receiver 244. The receiver 244 recovers the input signals $S_{in1}'$, $S_{in2}'$ by de-multiplexing the multiplexed input signal $S_m$ and performs operations of removing channel effects and demodulation on the recovered input signals $S_{in1}'$, $S_{in2}'$. The receiver 244 further generates a processed signal $S_p$ according to processing results of the input signals $S_{in1}'$, $S_{in2}'$ and the processed signal $S_p$ is fed into a combining unit 246 for following combining operations to generate a desired output signal $S_{out}$. The receiver 244 contains at least a buffering module for buffering an input signal (for example, the input signal $S_{in2}'$) when the receiver 244 is processing another input signal (for example, the input signal $S_{in1}'$). Please note that the multiplexer 242 can be omitted when the receiver 244 contains a plurality of input ports for receiving the input signals $S_{in1}'$, $S_{in2}'$ simultaneously. While the receiver 244 contains a plurality of output ports, processed results for the receiver 244 to process the input signals $S_{in1}'$, $S_{in2}'$ do not need to be multiplexed to a single processed signal $S_p$, but can be fed into the combining unit 246 immediately. The above-mentioned interior structure variations of the processing module 240 are meant to enable the above-mentioned embodiment to be able to process the input signals $S_{in1}'$, $S_{in2}'$ simultaneously with only one receiver 244. However, the receiving system 200 is not limited to the above-mentioned structures. Structures enabling the signal processing module 240 to process different input signals $S_{in1}'$, $S_{in2}'$ by a single receiver 244 also apply to the present invention.

Figure 3:
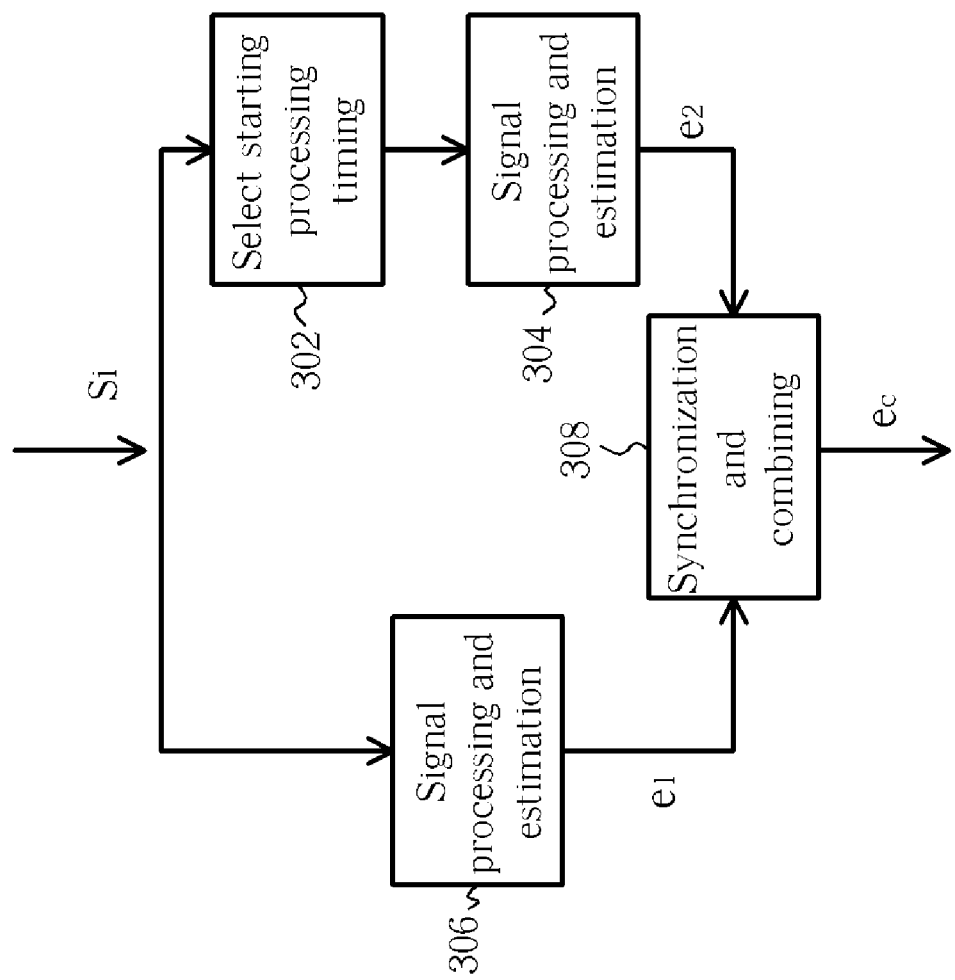
FIG. 3 is a flow chart illustrating a method provided by the present invention.

The first and the second embodiments mentioned above are examples for the present invention to be applied to an antenna diversity system. However, this should not be taken as a limitation of the present invention. Any signal processing apparatus or method utilizing a memory property of signal processing algorithm to estimate an input signal $S_i$ can adopt the present invention to increase a signal estimation accuracy. Please refer to FIG. 3. FIG. 3 is a flow chart illustrating a method provided by the present invention. As shown in FIG. 3, the input signal $S_i$ is fed into two sets of hardware to perform processing and estimation operations. One set of the hardware will choose a first starting processing timing different from a second starting processing timing corresponding to the other set of hardware (step 302). Because the two sets of hardware start to process the input signal $S_i$ at different starting processing timings, two estimated signals e1, e2 with different estimation errors are acquired after signal processing and estimation is performed on the input signal $S_i$ (steps 304, 306). The estimated signals e1, e2 are then synchronized and combined to generate a preferred estimated signal $e_c$ (step 308).

The claimed invention can be applied to a conventional signal processing apparatus or method easily. For example, as shown in FIG. 1, when a difference between SNRs of the received signals $S_{a1}$, $S_{a2}$ received by the antennas 142, 144 is small, the receiving module 130 transmits the received signals $S_{a1}$, $S_{a2}$ to the processing module 140 and the processing module 140 processes the received signals $S_{a1}$, $S_{a2}$ to generate the desired output signal $S_{out}$ (similar to the conventional antenna diversity technique). However, when an SNR of a specific received signal (say, the received signal $S_{a1}$) is much greater than an SNR of another received signal (say, the received signal $S_{a2}$), the input signals $S_{in1}$, $S_{in2}$ generated by the receiving module 130 will both correspond to the received signal $S_{a1}$. The receivers 142, 144 of the processing module 140 will respectively process the input signals $S_{in1}$, $S_{in2}$ corresponding to the received signal $S_{a1}$ with different states (different states correspond to different starting processing timings) to output the processed signals $S_{p1}$, $S_{p2}$. Then, the combining unit 146 combines the processed signals $S_{p1}$, $S_{p2}$ to generate the desired output signal $S_{out}$. In this way, the provided embodiment possesses not only the advantages introduced by a conventional antenna diversity technique, but also the advantages of increased estimation accuracy compared to the conventional antenna diversity technique.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiving apparatus, comprising:
    a receiving module for receiving an input signal according to a first timing and a second timing to generate a first input signal and a second input signal;
    a multiplexer, coupled to the receiving module, for multiplexing the first input signal and the second input signal to generate a multiplexed input signal; and
    estimating circuitry comprising a receiver and a combining unit, coupled to the multiplexer, for estimating the first input signal and the second input signal from the multiplexed input signal to generate a first estimated signal and a second estimated signal, and for combining the first and the second estimated signals to generate an estimated output signal.

2. The apparatus of claim 1, wherein the estimating circuitry averages the first and the second estimated signals to generate the estimated output signal.

3. The apparatus of claim 1, wherein the estimating circuitry averages the first and the second estimated signals according to a weighting factor to generate the estimated output signal.

4. The apparatus of claim 3, wherein the weighting factor corresponds to a reliability of the first and the second estimated signals.

5. The apparatus of claim 1, wherein the receiving module comprises:
    at least one selector for receiving the input signal and generating the first and the second input signals according to a control signal, wherein the control signal corresponds to the first timing and the second timing.

6. The apparatus of claim 5, wherein the at least one selector generates the first and the second input signals according to the control signal so that the input signals are a subset of the received signals.

7. The apparatus of claim 5, wherein the receiving module further comprises:
    a plurality of input ports, coupled to the at least one selector, for receiving a plurality of received signals, wherein the input signal is one of the received signals.

8. The apparatus of claim 7, wherein the received signals correspond to a plurality of signals transmitted through different transmission paths of a same remote signal source.

9. The apparatus of claim 7, further comprising:
    a plurality of antennas, for receiving the signals corresponding to the remote signal source to generate the received signals.

10. The apparatus of claim 1, wherein the apparatus outputs an output signal according to the estimated output signal, and the apparatus further comprises:
    a control logic unit, for outputting the control signal;
    wherein the control signal corresponds to at least one of a signal-to-noise ratio (SNR), a bit error rate (BER), and an error vector magnitude (EVM) of one of the received signal and the output signal.

11. The apparatus of claim 1, wherein a first portion of the first input signal and a second portion of the second input signal are defined by a common mathematical function.

12. A signal processing method, comprising:
    receiving two input signals corresponding to a same signal source with two different starting timings to generate a multiplexed input signal;
    estimating a first estimation signal and a second estimation signal from the multiplexed input signal; and
    generating an estimated output signal according to the first and the second estimation signals.

13. The method of claim 12, wherein the first estimation signal and the second estimation signal are estimated using a memory property of signal processing method.

14. The method of claim 12, wherein the generating step comprises:
    averaging the first and the second estimation signals to generate the estimated output signal.

15. The method of claim 12, wherein the generating step comprises:
    averaging the first and the second estimation signals according to a weighting factor to generate the estimated output signal.

16. The method of claim 15, wherein the weighting factor corresponds to a reliability of the first and the second estimation signals.

17. A signal processing method, comprising:
    receiving an input signal according to a first timing and a second timing to generate a multiplexed input signal including a first input signal and a second input signal;
    estimating a first estimation signal according to the first input signal of the multiplexed input signal;
    estimating a second estimation signal according to the second input signal of the multiplexed input signal; and
    combining the first and the second estimation signals to generate an estimated output signal.

18. The method of claim 17, wherein the combining step comprises:
    averaging the first and the second estimation signals to generate the estimated output signal.

19. The method of claim 18, wherein the averaging step is a weighted averaging step.

20. The method of claim 18, further comprising:
    outputting an output signal according to the estimated output signal;
    wherein the first timing and the second timing are determined according to at least one of a signal-to-noise ratio (SNR), a bit error rate (BER), and an error vector magnitude (EVM) of one of the input signal and the output signal.

* * * * *